Patented Oct. 2, 1934

1,975,727

UNITED STATES PATENT OFFICE 1,975,727

PROCESS FOR MAKING CHLOROFORM

Arthur Andrew Levine, Niagara Falls, N. Y., assignor to E. I. du Pont de Nemours & Company, Inc., Wilmington, Del., a corporation of Delaware No Drawing. Application November 16, 1933, Serial No. 698,361

11 Claims. (Cl. 260—166)

This invention relates to the chlorination of methylene chloride and more particularly to the chlorination of mixtures of methylene chloride and methyl chloride to produce chloroform.

It has been proposed to prepare chloroform by the chlorination of methane, or methyl chloride. The results have, however, not been satisfactory because if the ratio of methane or methyl chloride to chlorine is maintained high enough to prevent carbonization, the proportion of chloroform in the total product is very low; e. g. 2–4%. It has also been proposed to chlorinate substantially pure methylene chloride by reacting chlorine and methylene chloride at high temperatures using a volume ratio of about 1 to 5 respectively. Such a process is not entirely satisfactory because considerable carbon tetrachloride is formed as well as chloroform. Furthermore, in order to obtain pure methylene chloride for this process, chlorine must be reacted with a large excess of methyl chloride and the chlorination product fractionated to remove the excess methyl chloride.

It has also been proposed to produce chloroform from $CCl_4$ by treating with zinc dust or by reacting acetaldehyde or acetone with a calcium hypochlorite solution. Various photochemical processes have also been proposed for chlorinations leading to chloroform.

Some of the reactions occurring in the chlorination of methylene chloride and mixtures of methyl chloride and methylene chloride are as follows:

(a) $CH_3Cl + Cl_2 \rightarrow C + 3HCl$.
(b) $CH_3Cl + Cl_2 \rightarrow CH_2Cl_2 + HCl$.
(c) $CH_3Cl + 2Cl_2 \rightarrow CHCl_3 + 2HCl$.
(d) $CH_3Cl + 3Cl_2 \rightarrow CCl_4 + 3HCl$.
(e) $CH_2Cl_2 + Cl_2 \rightarrow CHCl_3 + HCl$.
(f) $CH_2Cl_2 + 2Cl_2 \rightarrow CCl_4 + 2HCl$.
(g) $CHCl_3 + Cl_2 \rightarrow CCl_4 + HCl$.

In general when a chlorohydrocarbon is chlorinated, a mixture of all of the various higher chlorides is produced, the composition depending upon the conditions of the reaction.

A process for preparing chloroform from a mixture of methyl and methylene chloride to be economically feasible must be so operated that the reaction product is composed mainly of lower unreacted chlorinated hydrocarbons and chloroform, and contains little or no carbon tetrachloride; that is, the chlorination should not be allowed to go beyond the formation of chloroform. The reason for this is apparent when one considers that methyl chloride and methylene chloride sell at 4 or 5 times the price of carbon tetrachloride; therefore, any carbon tetrachloride formed represents a monetary loss and causes a corresponding increase in the cost of the chloroform produced. A process which gave a high yield of chloroform and at the same time produced a considerable yield of carbon tetrachloride would be of little value in the industrial production of chloroform from mixtures of methyl chloride and/or methylene chloride. The proportion of chloroform produced to methyl and methylene chlorides in the product should be as high as possible in order to keep recovery and distillation costs at a minimum and to produce the maximum quantity of chloroform per cycle.

An object of this invention is to produce chloroform in high yield by the chlorination of mixtures of methyl chloride and methylene chloride, with the formation of a minimum amount of higher boiling materials or decomposition products. A further object is to produce chloroform by chlorinating a mixture of methyl chloride and methylene chloride, substantially without producing further amounts of methylene chloride. A further object is to produce chloroform by chlorinating a mixture of methyl chloride and methylene chloride under such conditions that the quantity of methylene chloride in the system remains constant and operating the process cyclically by replacing the methyl chloride used up. A still further object is a chlorination process whereby both methylene chloride and chloroform can be produced simultaneously by chlorinating a mixture of methyl and methylene chlorides. Other objects will be apparent from the following description of my process.

I have discovered that a good yield of chloroform may be obtained while the formation of carbon tetrachloride and/or other high-boiling products may be substantially prevented, by reacting a mixture of methyl chloride and methylene chloride with chlorine in the ratio of about 3 to 6 volumes of the mixture to one volume of chlorine, under suitable reaction conditions.

In my process the reaction conditions are so regulated and controlled that chloroform is the chief product of the reaction. Referring to the equations above, the reaction conditions are so controlled that reactions (c) and (e) occur whereas reactions (a) (d) (f) and (g) do not occur to any appreciable extent. Further the reaction is controlled to prevent the polymerization or cracking of the chlorinated compounds, thereby eliminating the production of low boiling or high boiling undesirable by-products.

I have found that in order to avoid carbonization according to reaction (a) it is necessary to avoid high temperatures and too large a percentage of chlorine in the reaction mixture. The carbonization of methyl chloride by chlorine is a highly exothermic reaction and if locally started spreads rapidly.

I have also discovered that by restricting the reaction conditions to within certain limits the total quantity of methylene chloride in the system can be kept constant or even reduced. The effect produced by keeping the quantity of methylene chloride in the system constant is the same as chlorinating methyl chloride directly to chloroform in one step because methyl chloride is the only material used up and chloroform is the only material produced. In case the amount of methylene chloride in the system is reduced, chloroform is in effect produced from both methyl chloride and methylene chloride.

More specifically I have found that when a mixture of 2 volumes of methyl chloride and 2 to 3 volumes of methylene chloride is reacted with 1 volume of chlorine at 400 to 500° C. until substantially all of the chlorine is used up, the mixed chlorides produced contain 10 to 15% of chloroform and substantially no carbon tetrachloride or other chlorinated products boiling at a temperature above the boiling point of chloroform are produced. I have also found that when 4 volumes of methyl chloride and 2 volumes of methylene chloride to about 2 volumes of methyl chloride and 3 volumes of methylene chloride are reacted with 1 volume of chlorine in a reactor maintained at 400–500° C. until substantially all of the chlorine is used up and the gases from the reactor are cooled, mixed with more chlorine and passed through a second reactor maintained at about the same temperature, the product of mixed chlorides contains between 15 and 30% of chloroform. In carrying out this two-step chlorination, I prefer to maintain the volumetric ratio of the total chlorinated hydrocarbons to chlorine at 3 to 6, in both chlorination steps.

My process may be carried out in any apparatus suitable for vapor phase chlorinations. One method of operation is to preheat a mixture of methyl chloride and methylene chloride to about 100° C. and then mix with the desired quantity of chlorine gas. Thorough mixing can be simply obtained by passing the chlorine gas into the mixture through a perforated tube.

The mixture of chlorohydrocarbons and chlorine is then passed into a silica lined reactor or through a silica tube maintained at a suitable reaction temperature by externally applied heat. The temperature in the reactor is ascertained, preferably by measuring the temperature in a fused silica tube extending into the reactor. It is found that temperature in the reactor increases to a maximum and then drops slowly. It is this maximum temperature which is hereinafter referred to as the reaction temperature.

The hot reaction gases leaving the furnace are cooled by an air or water cooler. The cooled gases are then treated to remove hydrochloric acid formed during the chlorination. This may be accomplished by scrubbing the gases with water and/or an alkaline solution such as a sodium hydroxide solution. The scrubbing is most conveniently accomplished on a laboratory scale by passing the gases in counter current flow to a sodium hydroxide solution through a tubular scrubber filled with glass beads.

After the removal of the hydrochloric acid, moisture is removed by a suitable drying agent, e. g., $P_2O_5$, anhydrous $CaCl_2$ or concentrated $H_2SO_4$. The water is preferably removed by circulating a 66° Baumé sulfuric acid solution in counter current flow to the gas stream passing through a tube filled with glass beads.

The gases leaving the sulfuric dryer are passed into a condensing coil immersed in a cooling bath consisting of carbon dioxide snow and alcohol. The liquefied mixture of chlorohydrocarbons is then fractionated to effect the separation of the various chlorohydrocarbon constituents.

Examples

Various mixtures of methyl chloride, methylene chloride, and chlorine were reacted by passing them through a silica tube about 4 inches inside diameter by about 36 inches in length at a temperature of approximately 450° C. The data and results are given in the following table. In runs 4 and 5, a two-step chlorination was used; the off-gas from the first chlorinator was cooled to about 200° C., mixed with additional chlorine and passed through a second chlorinator at about the same temperature as in the first chlorinator.

| | Example numbers | | | | |
|---|---|---|---|---|---|
| | 1 | 2 | 3 | 4 | 5 |
| Time in minutes | 100 | 95 | 102 | 74.5 | 110 |
| Methyl chloride flowmeter reading in grs. per minute | 20.6 | 12 | 13 | 21 | 16 |
| Methylene chloride flowmeter reading in grs. per minute | 23 | 30 | 21 | 23 | 27 |
| Chlorine flowmeter reading in grs. per minute—1st reactor | 9 | 9 | 9 | 9 | 9 |
| Chlorine flowmeter reading in grs. per minute—2nd reactor | -------- | -------- | -------- | 11 | 13 |
| Grs. of $CH_3Cl$ fed to reactor | 2205 | 1140 | 1155 | 1715 | 1731 |
| Ratio volume $CH_3Cl$ to 1 volume $Cl_2$ | 3.66 | 2.19 | 2.05 | 3.9 | 2.42 |
| Grs. of $CH_2Cl_2$ fed to reactor | 2264 | 2769 | 1961 | 1667 | 2988 |
| Ratio volume $CH_2Cl_2$ to 1 volume $Cl_2$ | 2.2 | 3.16 | 1.9 | 2.23 | 2.48 |
| Grs. chlorine fed to #1 reactor | 851 | 732 | 862 | 625 | 1004 |
| Grs. chlorine fed to #2 reactor | -------- | -------- | -------- | 642 | 1436 |
| Grams of crude product recovered | 4894 | 4184 | 3341 | 4108 | 5781 |
| $CH_3Cl$ in product | 39% | 25.3% | 24.9% | 28.4% | 15.5% |
| $CH_2Cl_2$ in product | 50.3% | 62% | 57.2% | 51.0% | 51.4% |
| Grams of $CH_2Cl_2$ in product | 2450 | 2595 | 1910 | 2100 | 2965 |
| $CHCl_3$ in product | 6.9% | 10.3% | 15.2% | 16.4% | 29.0% |
| High boiling material in product | None | None | 0.8% | 1.0% | 2.6% |
| Distillation loss | 3.8% | 2.4% | 1.9% | 3.2% | 1.5% |

As shown in the above examples, I am able to produce chloroform in high yield by chlorinating a mixture of methyl and methylene chloride. Further, by regulating the ratio of methyl chloride to methylene chloride to chlorine I am able to control the composition of the product so that I can produce chloroform and at the same time produce more methylene chloride. Also, I can produce chloroform by using up both methyl chloride and methylene chloride or I can maintain the quantity of methylene chloride in the system at substantial equality and in effect chlorinate methyl chloride directly to chloroform, although it is possible that the actual chlorination proceeds through the methylene chloride stage.

Although the examples given above show the chlorination of methylene chloride and mixtures of methyl and methylene chloride at about 450° C. my invention is not limited to that temperature. The reaction temperature may be lower than 450° C. if the time of contact is increased. Also the reaction temperature may be above 450° C., provided the time of contact is reduced and provided the temperature is not high enough to cause actual thermal decomposition of the chlorinated hydrocarbons passing through the reaction space. I prefer to operate in the temperature range of 400 to 650° C. Further, I can use a catalyst known to speed up the reaction between chlorine and chlorinated hydrocarbons. In case a catalyst is used, it usually is necessary to change the reaction conditions to suit the particular catalyst being used. As a catalyst, I may use iron or aluminum chloride impregnating a porous inert material, calcium or barium chloride, iodine vapor or other known chlorination catalysts.

I claim:

1. A process for the manufacture of chloroform comprising reacting chlorine with a mixture of methyl chloride and methylene chloride at a temperature between 400 and 650° C. until the chlorine is substantially completely consumed, the volume ratios of methyl chloride to methylene chloride to chlorine, measured under standard conditions of temperature and pressure, being between about 2:2:1 and 2:3:1.

2. A process for the manufacture of chloroform comprising reacting chlorine with a mixture of methyl chloride and methylene chloride at a temperature of about 450° C. until the chlorine is substantially completely consumed, the volume ratios of methyl chloride to methylene chloride to chlorine, measured under standard conditions of temperature and pressure, being between about 2:2:1 and 2:3:1.

3. A process for the manufacture of chloroform comprising reacting chlorine with a mixture of methyl chloride and methylene chloride at a temperature of about 450° C. until the chlorine is substantially completely consumed, the volume ratio of methyl chloride to methylene chloride to chlorine measured under standard conditions of temperature and pressure being about 2:2:1.

4. A process for the manufacture of chloroform comprising reacting chlorine with a mixture of methyl chloride and methylene chloride by passing said mixture through a reactor maintained at a temperature between 400 and 650° C. until the chlorine is substantially completely consumed, cooling the reaction product to a temperature of about 200° C., mixing chlorine with the cooled reaction product and thereafter passing this mixture through a second reactor maintained at a temperature between 400 and 650° C. until the chlorine is substantially completely consumed, the volume ratios under standard conditions of methyl chloride to methylene chloride to chlorine entering the first reactor being between about 2:2:1 and 4:3:1, the chlorine being added to the second reactor at a rate between 1 and 1.5 times the rate of chlorine addition to the mixture entering the first reactor.

5. A process for the manufacture of chloroform comprising reacting chlorine with a mixture of methyl chloride and methylene chloride by passing said mixture through a reactor maintained at a temperature of about 450° C. until the chlorine is substantially completely consumed, cooling the reaction product to a temperature of about 200° C., mixing chlorine with the cooled reaction product, and thereafter passing this mixture through a second reactor maintained at a temperature of about 450° C. until the chlorine is substantially completely consumed, the volume ratios under standard conditions of methyl chloride to methylene chloride to chlorine entering the first reactor being between about 2:2:1 and 4:3:1, the chlorine being added to the second reactor at a rate between 1 and 1.5 times the rate of chlorine addition to the mixture entering the first reactor.

6. A process for the manufacture of chloroform comprising reacting chlorine with a mixture of methyl chloride and methylene chloride by passing said mixture through a reactor maintained at a temperature of about 450° C. until the chlorine is substantially completely consumed, cooling the reaction product to a temperature of about 200° C., mixing chlorine with the cooled reaction product, and thereafter passing this mixture through a second reactor maintained at a temperature of about 450° C. until the chlorine is substantially completely consumed, the volume ratios under standard conditions of methyl chloride to methylene chloride to chlorine entering the first reactor being about 2.42 to 2.48 to 1, the chlorine being added to the second reactor at a rate between 1 and 1.5 times the rate of chlorine addition to the mixture entering the first reactor.

7. A process for the manufacture of chloroform comprising reacting chlorine with a mixture of methyl chloride and methylene chloride at a temperature between 400° and 650° C. until the chlorine is substantially completely consumed, the volume ratio of the sum of the volumes of methyl chloride and methylene chloride to chlorine being between 3 to 1 and 6 to 1 and the volume of methyl chloride to methylene chloride being such that the quantity of methylene chloride in the product is substantially equal to the quantity of methylene chloride in the original reaction mixture.

8. A process for the manufacture of chloroform comprising reacting chlorine with a mixture of methyl chloride and methylene chloride at a temperature between 400° and 650° C. until the chlorine is substantially completely consumed, cooling the reaction product to a temperature below about 200 C., mixing chlorine with the cooled reaction product and thereafter passing this mixture through a second chlorinator maintained at a temperature between 400 and 650° C. until the chlorine is substantially completely consumed, the volume ratio of the sum of the volumes of methyl chloride and methylene chloride to chlorine entering the first reactor being between 3 to 1 and 6 to 1, the chlorine being added to the second chlorinator at a rate between 1 and 1.5 times the rate of chlorine addition to the mixture entering the first reactor and the volume ratio of methyl chloride to methylene chloride being such that the quantity of methylene chloride in the product is substantially equal to the quantity of methylene chloride in the original reaction mixture.

9. A process for the manufacture of chloroform from methyl chloride comprising passing a mixture of methyl chloride, methylene chloride and chlorine through a reactor maintained at a temperature of about 450° C. until the chlorine is substantially completely consumed, the volume ratio of methyl chloride to methylene chloride to chlorine measured under standard conditions of temperature and pressure being about 2:2:1 and thereafter separating the unreacted methyl chloride and methylene chloride from the product, adding methyl chloride and chlorine in amounts sufficient to make the volume ratio of methyl chloride to methylene chloride to chlorine measured under standard conditions of temperature and pressure about 2:2:1 and then passing this mixture through said reactor as before.

10. A process for the manufacture of chloroform comprising reacting chlorine with a mixture of methyl chloride and methylene chloride by passing said mixture through a reactor maintained at a temperature of about 450° C. until the chlorine is substantially completely consumed, cooling the reaction product to a temperature of about 200° C., mixing chlorine with the cooled reaction product, and thereafter passing this mixture through a second reactor maintained at a temperature of about 450° C. until the chlorine is substantially completely consumed, the volume ratios under standard conditions of methyl chloride to methylene chloride to chlorine entering the first reactor being about 2.42:2.48:1, the chlorine being added to the second reactor at a rate between 1 and 1.5 times the rate of chlorine addition to the mixture entering the first reactor, separating methyl chloride and methylene chloride from the reaction product, adding sufficient methyl chloride and chlorine to bring the volume ratio to 2.42:2.48:1 and passing this mixture through said reactor maintained at a temperature of about 450° C.

11. A process for the manufacture of chloroform comprising reacting chlorine with a mixture of methyl chloride and methylene chloride at a temperature between 400° and 650° C. until the chlorine is substantially completely consumed, the volume ratio of the sum of the volumes of methyl chloride and methylene chloride to chlorine being between 3 to 1 and 6 to 1 and the volume of methyl chloride to methylene chloride being such that the quantity of methylene chloride in the product is substantially equal to the quantity of methylene chloride in the original reaction mixture, and thereafter separating methyl chloride and methylene chloride from the reaction product, adding methyl chloride and chlorine until the volume ratio of methyl chloride to methylene chloride to chlorine is substantially equal to the volume ratio in the original reaction mixture and recycling this mixture through the reactor as before.

ARTHUR ANDREW LEVINE.